United States Patent
Lee et al.

(10) Patent No.: US 10,316,179 B2
(45) Date of Patent: Jun. 11, 2019

(54) TRANSPARENT THERMOPLASTIC RESIN AND METHOD OF PREPARING THE SAME

(71) Applicant: LG CHEM, LTD., Seoul (KR)

(72) Inventors: Roo Da Lee, Daejeon (KR); Jeong Su Choi, Daejeon (KR); Keun Hoon Yoo, Daejeon (KR); Won Seok Lee, Daejeon (KR); Seok Goo Jang, Daejeon (KR); Sang Hoo Park, Daejeon (KR); Ho Hoon Kim, Daejeon (KR); Hyung Seop Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 15 days.

(21) Appl. No.: 15/541,001

(22) PCT Filed: Nov. 9, 2016

(86) PCT No.: PCT/KR2016/012841
§ 371 (c)(1),
(2) Date: Jun. 29, 2017

(87) PCT Pub. No.: WO2017/095038
PCT Pub. Date: Jun. 8, 2017

(65) Prior Publication Data
US 2017/0355845 A1 Dec. 14, 2017

(30) Foreign Application Priority Data
Nov. 30, 2015 (KR) .................. 10-2015-0168624

(51) Int. Cl.
| | |
|---|---|
| *C08F 257/02* | (2006.01) |
| *C08L 51/00* | (2006.01) |
| *C08L 53/02* | (2006.01) |
| *C08F 212/08* | (2006.01) |
| *C08F 212/10* | (2006.01) |
| *C08F 293/00* | (2006.01) |
| *C08L 25/12* | (2006.01) |
| *C08L 53/00* | (2006.01) |

(52) U.S. Cl.
CPC .......... *C08L 51/003* (2013.01); *C08F 212/08* (2013.01); *C08F 212/10* (2013.01); *C08F 257/02* (2013.01); *C08F 293/00* (2013.01); *C08L 25/12* (2013.01); *C08L 53/00* (2013.01); *C08L 53/02* (2013.01); *C08L 2201/10* (2013.01); *C08L 2205/02* (2013.01)

(58) Field of Classification Search
CPC .... C08F 212/08; C08F 212/10; C08F 257/02; C08F 293/00; C08F 293/005; C08L 25/12; C08L 51/003; C08L 53/00; C08L 53/02; C08L 2201/10; C08L 2205/02
See application file for complete search history.

(56) References Cited

U.S. PATENT DOCUMENTS

2017/0058117 A1* 3/2017 Sato .................. C08F 297/04

FOREIGN PATENT DOCUMENTS

| CN | 101851321 A | 10/2010 |
|---|---|---|
| CN | 104169314 A | 11/2014 |
| GB | 1476912 A | 6/1977 |
| JP | 3293701 B2 | 6/2002 |
| JP | 2009-155473 A | 7/2009 |
| KR | 10-2000-0039470 A | 7/2000 |
| KR | 10-2007-0073028 A | 7/2007 |
| KR | 10-2015-0072095 A | 6/2015 |
| WO | WO 2015/125707 A1 | 8/2015 |

OTHER PUBLICATIONS

Machine translation of KR10-2007-0073028 Downloaded Sep. 14, 2018.*
Fukuda, T. et al. Macromolecules vol. 29 pp. 3050-3052 (Apr. 1996).*
Gromadzki, D. et al. European Polymer Journal vol. 44 pp. 189-199 (Nov. 2007).*
Baumann, M. et al. Macromolecular Materials and Engineering vol. 280/281 pp. 1-6 (Aug. 2000).*
Detrembleur, C. et al. Macromolecules vol. 35 pp. 7214-7223 (Aug. 2002).*
Extended European Search Report for European Patent Application No. 16870934.3, dated Jul. 27, 2018.
Jelena Bozovic-Vukic et al., "SAN-b-P4VP Block Copolymer Synthesis by Chain Extension from RAFT-Functional Poly(4-vinylpyridine) in Solution and in Emulsion", Macromolecules, Sep. 5, 2007, pp. 7132-7139, vol. 40, No. 20.
International Search Report for PCT/KR2016/012841 filed Nov. 9, 2016.
Chinese Office Action issued in Application No. 2016800071841, dated Nov. 23, 2018.

* cited by examiner

*Primary Examiner* — Irina S Zemel
*Assistant Examiner* — Jeffrey S Lenihan

(57) ABSTRACT

The present invention relates to a transparent thermoplastic resin. More particularly, the present invention relates to a transparent thermoplastic resin, including a random copolymerization block prepared by polymerizing 50 to 80% by weight of an aromatic vinyl compound, 10 to 30% by weight of a vinyl cyanide compound, and 0 to 15% by weight of (meth)acrylic acid alkyl ester; and an aromatic vinyl compound block prepared by polymerizing 1 to 10% by weight of an aromatic vinyl compound, a transparent thermoplastic resin composition including the transparent thermoplastic resin, and methods of preparing the aromatic vinyl compound and transparent thermoplastic resin.

20 Claims, No Drawings

TRANSPARENT THERMOPLASTIC RESIN AND METHOD OF PREPARING THE SAME

CROSS-REFERENCE TO RELATED APPLICATION

This application is a U.S. National Stage Application of PCT/KR2016/012841 filed Nov. 9, 2016, which claims the priority benefit of Korean Patent Application No. 10-2015-0168624, filed on Nov. 30, 2015 in the Korean Intellectual Property Office, the disclosures of which are incorporated herein by reference.

TECHNICAL FIELD

The present invention relates to a transparent thermoplastic resin and a method of preparing the same. More particularly, the present invention relates to a transparent thermoplastic resin prepared to have a specific structure by controlling addition time points of monomers, a method of preparing the transparent thermoplastic resin, a transparent thermoplastic resin composition exhibiting superior transparency and impact strength and excellent fluidity, which causes superior processability, due to inclusion of the transparent thermoplastic resin, and a method of preparing the transparent thermoplastic resin composition.

BACKGROUND ART

In general, a resin used in products requiring transparency is made of a single ingredient substance to have a single refractive index. However, since the specific characteristics of each substance appear when a single ingredient substance is used, there are many restrictions in variously utilizing the substance in various fields. Accordingly, attempts to prepare a material providing transparency while using various substances to utilize advantageous specific properties thereof are ongoing.

In connection with this, an acrylonitrile-butadiene-styrene thermoplastic resin (hereinafter referred to as "ABS resin") has mechanical properties, such as processability, due to inclusion of styrene, stiffness and chemical resistance due to inclusion of acrylonitrile, and impact resistance due to inclusion of butadiene, and aesthetically pleasing appearance, thereby being variously used in automobile parts, home appliances, OA devices such as printers and scanners, etc. However, since refractive indexes of an acrylonitrile-based resin, a styrene-based resin, and a conjugated diene-based resin are greatly different from each other, realization of a transparency level similar to that exhibited in a single polymer through adjustment of the different refractive indexes has not yet been solved. In addition, although transparency is realized, it is very difficult to simultaneously increase impact strength and fluidity while retaining superior transparency. Therefore, these problems remain a major challenge.

RELATED ART DOCUMENT

[Patent Document] (Patent Document 1) JP3293701 B2

DISCLOSURE

Technical Problem

Therefore, the present invention has been made in view of the above problems, and it is one object of the present invention to provide a transparent thermoplastic resin prepared to have a specific structure by controlling addition time points of monomers and a method of preparing the same.

It is another object of the present invention to provide a transparent thermoplastic resin composition exhibiting superior transparency and impact strength and excellent fluidity, which causes superior processability, due to inclusion of the transparent thermoplastic resin and a method of preparing the transparent thermoplastic resin composition.

The above and other objects can be accomplished by the present disclosure described below.

Technical Solution

In accordance with one aspect of the present invention, provided is a transparent thermoplastic resin, including a random copolymerization block prepared by polymerizing 50 to 80% by weight of an aromatic vinyl compound, 10 to 30% by weight of a vinyl cyanide compound, and 0 to 15% by weight of (meth)acrylic acid alkyl ester; and an aromatic vinyl compound block prepared by polymerizing 1 to 10% by weight of an aromatic vinyl compound.

In accordance with another aspect of the present invention, there is provided a method of preparing a transparent thermoplastic resin, the method including a first polymerization step of polymerizing 50 to 80% by weight of an aromatic vinyl compound, 10 to 30% by weight of a vinyl cyanide compound, and 0 to 15% by weight of (meth)acrylic acid alkyl ester; a second polymerization step of polymerizing by additionally adding 1 to 10% by weight of the aromatic vinyl compound; and an obtainment step of obtaining a transparent thermoplastic resin.

In accordance with another aspect of the present invention, there is provided A transparent thermoplastic resin composition including greater than 5% by weight and less than 65% by weight of a transparent thermoplastic resin that includes a random copolymerization block prepared by polymerizing 50 to 80% by weight of an aromatic vinyl compound, 10 to 30% by weight of a vinyl cyanide compound, and 0 to 15% by weight of (meth)acrylic acid alkyl ester, and an aromatic vinyl compound block prepared by polymerizing 1 to 10% by weight of an aromatic vinyl compound; and greater than 35% by weight and less than to 95% by weight of an aromatic vinyl compound-conjugated diene-based compound block copolymer.

In accordance with yet another aspect of the present invention, there is provided a method of preparing a transparent thermoplastic resin composition, the method including: a first polymerization step of polymerizing 50 to 80% by weight of an aromatic vinyl compound, 10 to 30% by weight of a vinyl cyanide compound, and 0 to 15% by weight of (meth)acrylic acid alkyl ester; a second polymerization step of polymerizing by additionally adding 1 to 10% by weight of the aromatic vinyl compound; an obtainment step of obtaining a transparent thermoplastic resin; and a melting and kneading step of melting and kneading greater than 5% by weight and less than 65% by weight of the obtained transparent thermoplastic resin with greater than 35% by weight and less than to 95% by weight of an aromatic vinyl compound-conjugated diene-based compound block copolymer.

Advantageous Effects

As apparent from the fore-going, the present invention advantageously provides a transparent thermoplastic resin prepared to have a specific structure by controlling addition time points of monomers, a method of preparing the transparent thermoplastic resin, a transparent thermoplastic resin composition exhibiting superior transparency and impact strength and excellent fluidity, which causes superior processability, due to inclusion of the transparent thermoplastic resin, and a method of preparing the transparent thermoplastic resin composition.

Best Mode

Hereinafter, the present invention is described in detail.

The present inventors confirmed that, when a transparent thermoplastic resin including a random copolymerization block and an aromatic vinyl compound block is prepared while adjusting addition time points of some monomers, a resin composition including the transparent thermoplastic resin exhibits increased transparency and impact strength and excellent fluidity, which causes processability improvement, thus completing the present invention.

The transparent thermoplastic resin according to the present invention is now described in detail.

The transparent thermoplastic resin includes a random copolymerization block prepared by polymerizing 50 to 80% by weight of an aromatic vinyl compound, 10 to 30% by weight of a vinyl cyanide compound, and 0 to 15% by weight of (meth)acrylic acid alkyl ester; and an aromatic vinyl compound block prepared by polymerizing 1 to 10% by weight of an aromatic vinyl compound.

The random copolymerization block may be, for example, a block randomly copolymerized during first polymerization of the transparent thermoplastic resin, and the aromatic vinyl compound block may be, for example, a block polymerized during second polymerization of the transparent thermoplastic resin.

The aromatic vinyl compound block may be polymerized, for example, by being bonded to one end or both ends of the random copolymerization block. In this case, when the aromatic vinyl compound block is mixed with an aromatic vinyl compound-conjugated diene-based compound block copolymer, the aromatic vinyl compound-conjugated diene-based compound block copolymer exhibits superior compatibility with the aromatic vinyl compound block, whereby impact strength is increased.

The transparent thermoplastic resin may have, for example, a refractive index of 1.5675±0.0040, 1.5675±0.0030, or 1.5675±0.0020. When the transparent thermoplastic resin is mixed with an aromatic vinyl compound-conjugated diene-based compound block copolymer within this range, superior transparency is provided.

The transparent thermoplastic resin may have, for example, a weight average molecular weight of 185,000 to 300,000 g/mol, 185,000 to 280,000 g/mol, or 185,000 to 250,000 g/mol. Within this range, superior mechanical properties and property balance are exhibited.

A method of preparing the transparent thermoplastic resin according to the present invention includes a first polymerization step of polymerizing 50 to 80% by weight of an aromatic vinyl compound, 10 to 30% by weight of a vinyl cyanide compound, and 0 to 15% by weight of (meth)acrylic acid alkyl ester; a second polymerization step of polymerizing by additionally adding 1 to 10% by weight of the aromatic vinyl compound; and an obtainment step of obtaining a transparent thermoplastic resin. In this case, when the aromatic vinyl compound block is mixed with the aromatic vinyl compound-conjugated diene-based compound block copolymer, the aromatic vinyl compound-conjugated diene-based compound block copolymer exhibits superior compatibility with the aromatic vinyl compound block, whereby impact strength is increased.

The first polymerization step may be performed, for example, at 100 to 130° C., 100 to 120° C., or 105 to 115° C. Within this range, superior polymerization conversion rate is exhibited.

The second polymerization step may be performed, for example, at 130 to 150° C., 135 to 150° C., or 135 to 145° C. Within this range, superior polymerization conversion rate is exhibited.

Each of the first and second polymerization steps may be performed, for example, for 1 to 4 hours, 1 to 3 hours, or 1 hour 30 minutes to 3 hours. Within this range, superior polymerization conversion rate is exhibited.

The content of the aromatic vinyl compound added during the first polymerization step may be, for example, 50 to 80% by weight, 50 to 75% by weight, or 60 to 75% by weight, and the content of the aromatic vinyl compound added during the second polymerization step may be, for example, 1 to 10% by weight, 1 to 8% by weight, or 2 to 7% by weight. Within this range, superior transparency, impact strength, and melt index are exhibited.

A total content of the aromatic vinyl compound added during the first and second polymerization steps may be, for example, 50 to 80% by weight, 60 to 80% by weight, or 65 to 80% by weight. Within this range, superior transparency and impact strength are provided.

Each of the first and second polymerization steps may be, for example, bulk polymerization, suspension polymerization, or emulsion polymerization, preferably bulk polymerization. In this case, productivity is superior.

The aromatic vinyl compound may be, for example, one or more selected from the group consisting of styrene, α-methylstyrene, p-methylstyrene, o-ethylstyrene, p-ethylstyrene, and vinyltoluene.

The vinyl cyanide compound may be, for example, one or more selected from the group consisting of acrylonitrile, methacrylonitrile, and ethacrylonitrile. The content of the vinyl cyanide compound may be, for example, 10 to 30% by weight, 15 to 30% by weight, or 18 to 29% by weight. Within this range, superior mechanical properties and property balance are exhibited.

The (meth)acrylic acid alkyl ester may be, for example, one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester. The content of the (meth)acrylic acid alkyl ester may be, for example, 0 to 15% by weight, 0 to 13% by weight, or 0 to 10% by weight. Within this range, superior impact strength and melt index are exhibited.

A transparent thermoplastic resin composition according to the present invention includes greater than 5% by weight and less than 65% by weight of a transparent thermoplastic resin that includes a random copolymerization block prepared by polymerizing 50 to 80% by weight of an aromatic vinyl compound, 10 to 30% by weight of a vinyl cyanide compound, and 0 to 15% by weight of (meth)acrylic acid alkyl ester, and an aromatic vinyl compound block prepared by polymerizing 1 to 10% by weight of an aromatic vinyl compound; and greater than 35% by weight and less than to 95% by weight of an aromatic vinyl compound-conjugated diene-based compound block copolymer.

An aromatic vinyl compound included in the aromatic vinyl compound-conjugated diene-based compound block copolymer may be, for example, one or more selected from the group consisting of styrene, α-methylstyrene, p-methylstyrene, o-ethylstyrene, p-ethylstyrene, and vinyltoluene. The aromatic vinyl compound may be included in an amount of 10 to 90% by weight, 30 to 90% by weight, or 50 to 90% by weight with respect to the aromatic vinyl compound-conjugated diene-based compound block copolymer. Within this range, superior transparency and mechanical properties are exhibited.

A conjugated diene-based compound included in the aromatic vinyl compound-conjugated diene-based compound block copolymer may be, for example, one or more selected from the group consisting of 1,3-butadiene, 2-methyl-1,3-butadiene, 2,3-dimethyl-1,3-butadiene, 2-ethyl-1,3-butadiene, 2,3-dimethyl-1,3-butadiene, 1,3-pentadiene, and chloroprene. The conjugated diene-based compound may be included in an amount of 10 to 90% by weight, 10 to 70% by weight, or 10 to 50% by weight with respect to the aromatic vinyl compound-conjugated diene-based compound block copolymer. Within this range, superior impact strength and transparency is provided.

The transparent thermoplastic resin may be included, for example, in an amount of greater than 5% by weight and less than 65% by weight, 10 to 50% by weight, 20 to 50% by weight, or 30 to 50% by weight with respect to the transparent thermoplastic resin composition. Within this range, superior transparency and property balance are exhibited.

The aromatic vinyl compound-conjugated diene-based compound block copolymer may be included, for example, in an amount of greater than 35% by weight and less than to 95% by weight, 50 to 90% by weight, 50 to 80% by weight, or 50 to 70% by weight with respect to the transparent thermoplastic resin composition. Within this range, impact strength, superior melt index and property balance are exhibited.

The transparent thermoplastic resin composition may have, for example, a transparency (haze) of 2.0 or less, 0.1 to 2.0, or 1.0 to 1.9. Within this range, superior transparency is provided.

The transparent thermoplastic resin composition may have, for example, a transmittance (Tt) of 89.9% or more, 89.9 to 99.9%, or 90.0 to 95.0%. Within this range, superior transparency is provided.

The transparent thermoplastic resin composition may have, for example, an impact strength of greater than 10.6 kgf·cm/cm, 10.6 to 20 kgf·cm/cm, or 11.0 to 15.0 kgf·cm/cm.

The transparent thermoplastic resin composition may have, for example, a melt index of 8.0 to 15.0 g/10 min, 8.5 to 13.0 g/10 min, or 8.6 to 12.0 g/10 min (under conditions of 200° C. and 5 kg).

A method of preparing the transparent thermoplastic resin composition according to the present invention includes a first polymerization step of polymerizing 50 to 80% by weight of an aromatic vinyl compound, 10 to 30% by weight of a vinyl cyanide compound, and 0 to 15% by weight of (meth)acrylic acid alkyl ester; a second polymerization step of polymerizing by additionally adding 1 to 10% by weight of the aromatic vinyl compound; an obtainment step of obtaining a transparent thermoplastic resin; and a melting and kneading step of melting and kneading greater than 5% by weight and less than 65% by weight of the obtained transparent thermoplastic resin with greater than 35% by weight and less than to 95% by weight of an aromatic vinyl compound-conjugated diene-based compound block copolymer.

The aromatic vinyl compound-conjugated diene-based compound block copolymer may be understood as a general block copolymer wherein each of the aromatic vinyl compound and the conjugated diene-based compound forms a block. As needed, the aromatic vinyl compound-conjugated diene-based compound block copolymer may further include a block composed of a monomer that may be copolymerized with each of the monomers. Here, a polymerization method is not specifically limited so long as the block copolymer may be polymerized. A monomer copolymerizable with each of the monomers may be, for example, a vinyl cyanide compound, an unsaturated carboxylic acid, an anhydride thereof, or the like.

The melting and kneading step may be performed by means of a general extruder. For example, a Banbury mixer, a single-screw extruder, a twin-screw extruder, a Buss kneader, or the like may be used. In addition, the melting and kneading step may be performed at 200 to 300°, 200 to 250° C., or 210 to 230° C.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

PREPARATION EXAMPLES

Preparation Example 1

68 parts by weight of styrene, 9 parts by weight of methyl methacrylate, 20 parts by weight of acrylonitrile, 0.14 parts by weight of azobisisobutyronitrile as an initiator, and 25 parts by weight of ethylbenzene as a reactive medium were fed into a reactor and mixed therein, and bulk polymerization (first polymerization) was performed at 110° for two hours. Subsequently, 3 parts by weight of styrene were additionally added thereto at 140° C., and bulk polymerization was performed for two hours. As a result, a transparent thermoplastic resin was prepared. The prepared resin exhibited a refractive index of 1.5670 and a weight average molecular weight of 231,000 g/mol.

Preparation Example 2

An experiment was performed in the same manner as in Preparation Example 1, except that 69 parts by weight of styrene and 28 parts by weight of acrylonitrile, instead of 68 parts by weight of styrene, 9 parts by weight of methyl methacrylate, and 20 parts by weight of acrylonitrile, were added during first polymerization. An obtained resin exhibited a refractive index of 1.5690 and a weight average molecular weight of 188,000 g/mol.

Preparation Example 3

An experiment was performed in the same manner as in Preparation Example 1, except that 65 parts by weight of styrene were added during first polymerization and 6 parts by weight of styrene were added during second polymerization. An obtained resin exhibited a refractive index of 1.5679 and a weight average molecular weight of 211,000 g/mol.

Preparation Example 4

An experiment was performed in the same manner as in Preparation Example 1, except that 71 parts by weight of styrene were added during first polymerization and second polymerization was not separately performed. An obtained resin exhibited a refractive index of 1.5630 and a weight average molecular weight of 220,000 g/mol.

Preparation Example 5

An experiment was performed in the same manner as in Preparation Example 1, except that 72 parts by weight of styrene and 28 parts by weight of acrylonitrile, instead of 68 parts by weight of styrene, 9 parts by weight of methyl methacrylate, and 20 parts by weight of acrylonitrile, were added during first polymerization and second polymerization was not separately performed. An obtained resin exhibited a refractive index of 1.5670 and a weight average molecular weight of 182,000 g/mol.

Preparation Example 6

An experiment was performed in the same manner as in Preparation Example 1, except that 60 parts by weight of styrene were added during first polymerization and 11 parts by weight of styrene were added during second polymerization. An obtained resin exhibited a refractive index of 1.5570 and a weight average molecular weight of 175,000 g/mol.

EXAMPLE

Examples 1 to 5 and Comparative Examples 1 to 5

The transparent thermoplastic resin prepared according to each of Preparation Examples 1 to 6 was mixed with a styrene-butadiene block copolymer including 30% by weight of butadiene and having a refractive index of 1.5675 (product name: KK-38 grade, manufactured by Chevron-Phillips) in amounts summarized in Table 1 below. A resultant mixture was prepared into a pellet-type thermoplastic transparent resin composition by means of a twin-screw extrusion kneader at a cylinder temperature of 220° C. The pellet-type thermoplastic transparent resin composition was injection-molded, thereby manufacturing a specimen for measuring properties.

TABLE 1

| Classification | Examples | | | | | Comparative Examples | | | | |
|---|---|---|---|---|---|---|---|---|---|---|
| | 1 | 2 | 3 | 4 | 5 | 1 | 2 | 3 | 4 | 5 |
| Preparation Example 1 | 35 | — | — | 50 | — | — | — | — | — | 5 |
| Preparation Example 2 | — | 45 | — | — | 30 | — | — | — | 65 | — |
| Preparation Example 3 | — | — | 35 | — | — | — | — | — | — | — |
| Preparation Example 4 | — | — | — | — | — | 35 | — | — | — | — |
| Preparation Example 5 | — | — | — | — | — | — | 45 | — | — | — |
| Preparation Example 6 | — | — | — | — | — | — | — | 35 | — | — |
| Styrene-butadiene block copolymer | 65 | 55 | 65 | 50 | 70 | 65 | 55 | 65 | 35 | 95 |
| Total (% by weight) | 100 | 100 | 100 | 100 | 100 | 100 | 100 | 100 | 100 | 100 |

Test Example

The properties of an acrylic resin composition specimen obtained according to each of Examples 1 to 5 and Comparative Examples 1 to 5 were measured according to the following methods. Results are summarized in Table 2 below.

Measurement Methods

Refractive index: A specimen was thinly sliced to a thickness of about 0.2 mm, and then the refractive index thereof was measured by means of Abbe's refractometer at 25° C.

Weight average molecular weight: Measured calibrating with PC standard by means of Agilent 1200 series GPC.

Transparency and transmittance (Haze, Tt): The transparency and transmittance of a specimen were respectively measured according to a standard measurement method, ASTM D1003.

Impact strength (Notched Izod, kgf·cm/cm): A ¼" specimen was used and the impact strength thereof was measured according to a standard measurement method, ASTM D256.

Melt index (g/10 min): A specimen was used and the melt index thereof was measured according to a standard measurement method, ASTM D1238 (under conditions of 200° C. and 5 kg).

TABLE 2

| Classification | Examples | | | | | Comparative Examples | | | | |
|---|---|---|---|---|---|---|---|---|---|---|
| | 1 | 2 | 3 | 4 | 5 | 1 | 2 | 3 | 4 | 5 |
| Transparency (haze) | 1.1 | 1.8 | 1.5 | 1.2 | 1.7 | 2.3 | 2.1 | 5.4 | 1.9 | 4.5 |
| Transmittance (Tt) | 90.3 | 90.0 | 90.2 | 90.3 | 90.0 | 89.8 | 89.5 | 85.3 | 90.1 | 89.4 |
| Impact strength | 13.0 | 11.2 | 12.5 | 10.9 | 19.6 | 8.3 | 6.5 | 10.6 | 5.6 | 15.3 |
| Melt index | 9.1 | 12.0 | 8.6 | 8.1 | 14.1 | 8.5 | 11.0 | 9.0 | 7.9 | 10.2 |

As shown in Table 2, it can be confirmed that, in the cases of Examples 1 to 5 including the transparent thermoplastic resin prepared according to the present invention, transparency, transmittance, impact strength, and melt index are all improved.

On the other hand, it can be confirmed that, in the cases of Comparative Example 1 and 2 in which styrene is not additionally added, transparency, transmittance and impact strength are poor although monomers are included in the same contents. In addition, it can be confirmed that, in the case of Comparative Example 3 in which styrene is added in an excessive amount during second polymerization, transparency is rapidly decreased and transmittance and impact strength are poor. Further, it can be confirmed that, in the case of Comparative Example 4 in which the thermoplastic resin prepared according to the present invention is included in a large amount, impact strength and melt index are decreased and, in the case of Comparative Example 5 in which the thermoplastic resin is included in a small amount, transparency and transmittance are poor.

From these result, the present inventors confirmed that the resin composition including the transparent thermoplastic resin, which includes the random copolymerization block and the aromatic vinyl compound block, provides increased transparency and impact strength, and excellent fluidity causing processability improvement.

The invention claimed is:

1. A transparent thermoplastic resin, comprising:
   a random copolymerization block prepared by polymerizing 50 to 80% by weight relative to a weight of the transparent thermoplastic resin of an aromatic vinyl compound, 10 to 30% by weight relative to the weight of the transparent thermoplastic resin of a vinyl cyanide compound, and greater than 0% up to 15% by weight relative to the weight of the transparent thermoplastic resin of (meth)acrylic acid alkyl ester; and
   an aromatic vinyl compound block prepared by polymerizing 1 to 10% by weight relative to the weight of the transparent thermoplastic resin of an aromatic vinyl compound.

2. The transparent thermoplastic resin according to claim 1, wherein the aromatic vinyl compound block is bonded to one end or both ends of the random copolymerization block.

3. The transparent thermoplastic resin according to claim 1, wherein the transparent thermoplastic resin has a refractive index of 1.5675±0.0040.

4. The transparent thermoplastic resin according to claim 1, wherein the transparent thermoplastic resin has a weight average molecular weight of 185,000 to 300,000 g/mol.

5. A method of preparing a transparent thermoplastic resin, the method comprising:
   a first polymerization step of polymerizing 50 to 80% by weight relative to a weight of the transparent thermoplastic resin of an aromatic vinyl compound, 10 to 30% by weight relative to the weight of the transparent thermoplastic resin of a vinyl cyanide compound, and greater than 0% up to 15% by weight relative to the weight of the transparent thermoplastic resin of (meth)acrylic acid alkyl ester;
   a second polymerization step of polymerizing by additionally adding 1 to 10% by weight relative to the weight of the transparent thermoplastic resin of the aromatic vinyl compound; and
   an obtainment step of obtaining a transparent thermoplastic resin.

6. The method according to claim 5, wherein the first polymerization step is performed at 100 to 130° C.

7. The method according to claim 5, wherein the second polymerization step is performed at 130 to 150° C.

8. The method according to claim 5, wherein each of the first and second polymerization steps is performed for one to four hours.

9. The method according to claim 5, wherein a total content of the aromatic vinyl compound added during the first and second polymerization steps is 50 to 80% by weight.

10. The method according to claim 5, wherein the polymerization is bulk polymerization, suspension polymerization, or emulsion polymerization.

11. The method according to claim 5, wherein the aromatic vinyl compound is one or more selected from the group consisting of styrene, a-methylstyrene, p-methyl styrene, o-ethylstyrene, p-ethylstyrene, and vinyltoluene.

12. The method according to claim 5, wherein the vinyl cyanide compound is one or more selected from the group consisting of acrylonitrile, methacrylonitrile, and ethacrylonitrile.

13. The method according to claim 5, wherein the (meth) acrylic acid alkyl ester is one or more selected from the group consisting of (meth)acrylic acid methyl ester, (meth) acrylic acid ethyl ester, (meth)acrylic acid propyl ester, (meth)acrylic acid 2-ethylhexyl ester, (meth)acrylic acid decyl ester, and (meth)acrylic acid lauryl ester.

14. A transparent thermoplastic resin composition, comprising:
   greater than 5% by weight and less than 65% by weight relative to a weight of the transparent thermoplastic resin composition of a transparent thermoplastic resin that comprises a random copolymerization block prepared by polymerizing 50 to 80% by weight relative to a weight of the transparent thermoplastic resin of an aromatic vinyl compound, 10 to 30% by weight relative to the weight of the transparent thermoplastic resin of a vinyl cyanide compound, and greater than 0% up to 15% by weight relative to the weight of the transparent thermoplastic resin of (meth)acrylic acid alkyl ester, and an aromatic vinyl compound block prepared by polymerizing 1 to 10% by weight relative to the weight of the transparent thermoplastic resin of an aromatic vinyl compound; and
   greater than 35% by weight and less than to 95% by weight relative to the weight of the transparent thermoplastic resin composition of an aromatic vinyl compound-conjugated diene-based compound block copolymer.

15. The transparent thermoplastic resin composition according to claim 14, wherein the aromatic vinyl compound-conjugated diene-based compound block copolymer comprises 10 to 90% by weight of a conjugated diene-based compound.

16. The transparent thermoplastic resin composition according to claim 14, wherein the conjugated diene-based compound is one or more selected from the group consisting of 1,3-butadiene, 2-methyl-1,3-butadiene, 2,3-dimethyl-1,3-butadiene, 2-ethyl-1,3-butadiene, 2,3-dimethyl-1,3-butadiene, 1,3-pentadiene, and chloroprene.

17. The transparent thermoplastic resin composition according to claim 14, wherein the transparent thermoplastic resin composition has a transparency (haze) of 2.0 or less.

18. The transparent thermoplastic resin composition according to claim 14, wherein the transparent thermoplastic resin composition has a transmittance (Tt) of 89.9%.

19. The transparent thermoplastic resin composition according to claim 14, wherein the transparent thermoplastic resin composition has an impact strength of greater than 10.6 kgf·cm/cm.

20. The transparent thermoplastic resin composition according to claim 14, wherein the (meth)acrylic acid alkyl ester is one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth) acrylic acid lauryl ester.

* * * * *